(12) United States Patent
Oldani et al.

(10) Patent No.: US 8,910,990 B1
(45) Date of Patent: Dec. 16, 2014

(54) DEVICE DOCK

(71) Applicant: Ford Global Technologies, LLC, Dearborn, MI (US)

(72) Inventors: Raymond Anthony Oldani, Canton, MI (US); Scott Simon, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/966,835

(22) Filed: Aug. 14, 2013

(51) Int. Cl.
*B60R 11/00* (2006.01)
*B60R 11/02* (2006.01)
*G06F 1/16* (2006.01)
*B60R 7/06* (2006.01)

(52) U.S. Cl.
CPC .......... *B60R 11/0258* (2013.01); *G06F 1/1632* (2013.01); *B60R 7/06* (2013.01)
USPC ......... 296/37.8; 296/37.12; 296/70; 224/485; 220/260

(58) Field of Classification Search
CPC .............. B60R 7/04; B60R 7/06; B60R 7/08; B60R 11/02; B60R 11/0235; B60R 11/0241; B60R 11/0258
USPC ............. 296/24.34, 37.8, 37.12, 70; 224/281, 224/483, 485; 206/335; 220/260
See application file for complete search history.

(56) References Cited

U.S. PATENT DOCUMENTS

| | | |
|---|---|---|
| 4,670,988 A | 6/1987 | Baxter |
| 5,276,596 A | 1/1994 | Krenzel |
| 5,779,205 A | 7/1998 | Ching |
| 5,799,914 A | 9/1998 | Chivallier et al. |
| 5,842,481 A | 12/1998 | King |
| 5,988,572 A | 11/1999 | Chivallier et al. |
| 6,062,518 A | 5/2000 | Etue |

(Continued)

FOREIGN PATENT DOCUMENTS

| | | |
|---|---|---|
| DE | 202011004924 U1 | 10/2011 |
| DE | 102010025563 A1 | 12/2011 |

(Continued)

OTHER PUBLICATIONS

In-Car Mobile Mounting Brackets, Chargers and Ruggedised Technology Cases, ace, Nemesis GB Ltd., 4 pages, dated Jul. 17, 2012.

(Continued)

*Primary Examiner* — Glenn Dayoan
*Assistant Examiner* — Jason S Daniels
(74) *Attorney, Agent, or Firm* — Vichit Chea; Price Heneveld LLP (57) ABSTRACT

A portable electronic device dock includes a storage unit and a lid, wherein the lid is adapted to clamp a portable electronic device between a portion of the lid and a portion of the storage unit to retain the portable electronic device in a user-accessible display position. The device dock includes a slide assembly adapted to bias the lid to an open position and a clutch assembly adapted to retain the lid in a clamped position on the portable electronic device. The slide assembly is coupled to an axle member, which is further coupled to support arms disposed on the lid. The slide assembly is further coupled to the clutch assembly on an opposite end such that the clutch assembly can limit movement of the slide assembly to further limit movement of the lid.

15 Claims, 6 Drawing Sheets

(56) References Cited

U.S. PATENT DOCUMENTS

| | | |
|---|---|---|
| 6,417,786 B2 | 7/2002 | Learman et al. |
| 6,524,240 B1 | 2/2003 | Thede |
| 6,539,358 B1 | 3/2003 | Coon et al. |
| 6,633,482 B2 | 10/2003 | Rode |
| 7,062,300 B1 | 6/2006 | Kim |
| 7,140,586 B2 | 11/2006 | Seil et al. |
| 7,269,002 B1 | 9/2007 | Turner et al. |
| 7,413,155 B2 | 8/2008 | Seil et al. |
| 7,623,958 B1 * | 11/2009 | Laverick et al. ............. 701/444 |
| 7,873,771 B2 | 1/2011 | Krueger et al. |
| 7,930,004 B2 | 4/2011 | Seil et al. |
| 7,930,006 B2 | 4/2011 | Neu et al. |
| 7,931,505 B2 | 4/2011 | Howard et al. |
| 7,933,117 B2 | 4/2011 | Howarth et al. |
| 8,145,821 B2 | 3/2012 | Mead et al. |
| 8,172,293 B2 | 5/2012 | Lota et al. |
| 8,183,825 B2 | 5/2012 | Sa |
| 8,242,906 B2 | 8/2012 | Fawcett |
| 8,325,028 B2 | 12/2012 | Schofield et al. |
| 8,376,595 B2 | 2/2013 | Higgins-Luthman |
| 8,393,584 B2 | 3/2013 | Burns |
| 8,492,698 B2 | 7/2013 | Schofield et al. |
| 8,496,144 B2 | 7/2013 | Son |
| 2004/0023633 A1 | 2/2004 | Gordon |
| 2005/0014536 A1 | 1/2005 | Grady |
| 2005/0045681 A1 | 3/2005 | Hancock et al. |
| 2006/0052144 A1 | 3/2006 | Seil et al. |
| 2007/0018064 A1 | 1/2007 | Wang |
| 2007/0114974 A1 | 5/2007 | Grady |
| 2007/0281619 A1 | 12/2007 | Chen |
| 2008/0019082 A1 | 1/2008 | Krieger et al. |
| 2008/0174136 A1 * | 7/2008 | Welschholz et al. ....... 296/37.12 |
| 2009/0275362 A1 | 11/2009 | Tieman et al. |
| 2010/0078536 A1 | 4/2010 | Galvin |
| 2011/0121148 A1 | 5/2011 | Pernia |
| 2011/0163211 A1 | 7/2011 | Cicco |
| 2011/0259789 A1 | 10/2011 | Fan |
| 2011/0263293 A1 | 10/2011 | Blake et al. |
| 2012/0018473 A1 | 1/2012 | Da Costa Pito et al. |
| 2012/0061983 A1 | 3/2012 | Seiller et al. |
| 2012/0318796 A1 | 12/2012 | Doll |
| 2013/0043779 A1 | 2/2013 | Fan |

FOREIGN PATENT DOCUMENTS

| | | |
|---|---|---|
| EP | 2124129 A2 | 11/2009 |
| EP | 2431230 A1 | 3/2012 |
| FR | 2921315 A1 * | 3/2009 |
| KR | 100895585 | 4/2009 |
| WO | 2009127439 A2 | 10/2009 |
| WO | 2009143969 A1 | 12/2009 |
| WO | 2010018011 A1 | 2/2010 |
| WO | 2011047984 A2 | 4/2011 |
| WO | 2011060963 A1 | 5/2011 |

OTHER PUBLICATIONS

"Galaxy S III charting Dock," iBolt.co, http://ibolt.com, 2 pages, Copyrighted 2012 iBolt Co.

"Top Cellet Vehicle Dash Phone Holder for Cell Phones & Smartphones," Rocky Case, 2 pages, Copyrighted 2013, www.rockycase.com.

* cited by examiner

DEVICE DOCK

FIELD OF THE INVENTION

The present invention generally relates to a portable electronic device dock, and more particularly, to a portable electronic device dock adapted to be disposed within an instrument panel of a motor vehicle.

BACKGROUND OF THE INVENTION

Portable devices are widely used and becoming commonplace in a variety of settings. One particular setting involves use of such devices inside a traveling vehicle to assist the vehicle occupants and enhance a trip experience. Popular portable devices often include navigation units and mobile cellular devices having navigation software. Power for such mobile devices may be accommodated through a vehicle's preexisting power supply input such as a cigarette lighter or an auxiliary power port. The portable device is then, often times, placed in the vehicle console, on an instrument panel or on a dashboard where the portable device is not properly secured and not easily accessible or visible to vehicle occupants. Further, the power cables necessary to run the portable device are often loose and unsightly. Known portable device holders are often limited with respect to the size and shape of a portable device that can be supported by the shape and dimensions of the device holder. Further, known device holder assemblies are often complex in nature for the position and retention of a portable device therein, adding unnecessary costs to a device holding assembly. For these types of scenarios, it is desirable to provide an adjustable portable device holder that compliments a vehicle spatial interior relative to the location of the user and other accessible features and devices within the vehicle.

SUMMARY OF THE INVENTION

One aspect of the present invention includes, a portable electronic device dock having a storage compartment with a lid, wherein the lid is operable between open and closed positions relative to the storage compartment. A slide assembly is operably coupled to both the lid and the storage compartment. The slide assembly is adapted to bias the lid to the open position. A clutch assembly is gearingly engaged with the slide assembly and is adapted to retain the lid in a clamped position. An electronic device is secured between the lid and the storage compartment when the lid is in the clamped position.

Another aspect of the present invention includes, a portable electronic device dock having a storage compartment disposed in a vehicle dashboard. A lid is hingedly coupled to the storage compartment. A slide assembly is coupled to both the lid and the storage compartment, and is adapted to bias the lid to an open position. A clutch assembly is coupled to the slide assembly and adapted to retain the lid in a clamped position to clamp an electronic device between the lid and the storage compartment.

Yet another aspect of the present invention includes a portable electronic device dock having a storage compartment with a lid which is operable between open and closed positions relative to the storage compartment. A slide assembly is gearingly coupled to the lid. A biasing member is operably coupled to the slide assembly at a first end and further coupled to the storage compartment at a second end. The biasing member is adapted to bias the lid to the open position by driving the slide assembly to a retracted position. A clutch assembly is gearingly engaged with the slide assembly and adapted to retain the slide assembly in a partially extended position, such that an electronic device is secured between the lid and the storage compartment.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
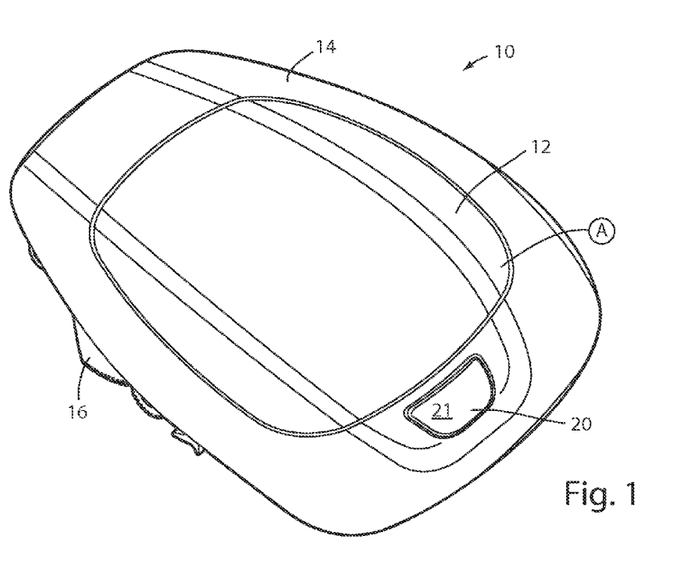
FIG. 1 is a top perspective view of a portable electronic device dock having a lid in a closed position according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
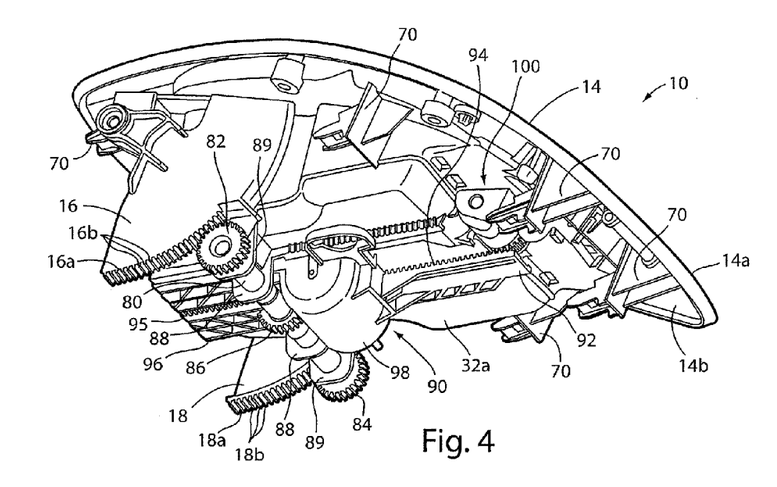
FIG. 4 is a bottom perspective view of the portable electronic device dock of FIG. 1.

Referring now to FIG. 1, a portable electronic device dock is generally indicated by reference numeral 10. The device dock, 10 is adapted to be secured in an instrument panel of a motor vehicle interior as further described below with reference to FIGS. 7 and 8. The device dock 10 includes a lid 12 which is hingedly connected to a housing 14 by a pair of support arms 16, 18 as best shown in FIG. 4. The device dock 10 further includes an actuator assembly 20 having an actuator button 21. In use, the actuator assembly is adapted to retain the lid 12 in the closed position A as shown in FIG. 1 and further described below. The lid 12 is operable between the closed position A (FIG. 1) and an open position B (FIG. 2), and it is contemplated that the lid 12 is biased to the open position B by a biasing mechanism, such that the lid 12 automatically moves to the open position B when the lid 12 is released by the actuator button 12 from the closed position A as further described below.

Figure 2:
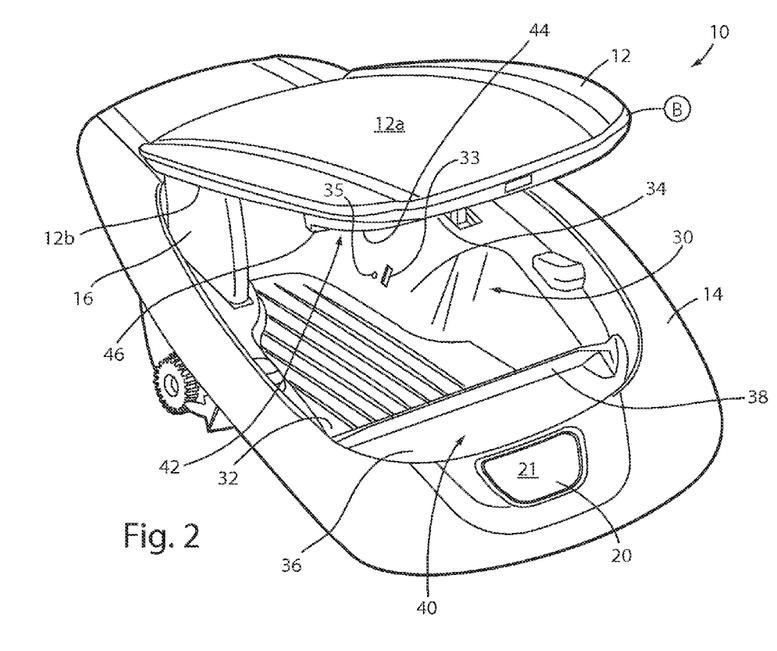
FIG. 2 is a top perspective view of the portable electronic device dock of FIG. 1 having the lid in an open position.

Referring now to FIG. 2, the device dock 10 is shown with the lid 12 in the open position B. As shown in FIG. 2, when the lid 12 is in the open position B, a storage compartment 30 is revealed and accessible to the vehicle occupants. The storage compartment 30 may be integrally formed with the housing 14 and includes a bottom wall 32 and a wraparound side wall 34 extending upwardly from the bottom wall 32. As shown in the embodiment of FIG. 2, the storage compartment 30 further includes connection ports, such as a USB port 33 and an audio port 35 which allow for an electronic device to integrate with the electrical system of the vehicle, to possibly charge the electronic device, or to play music from the electronic device. The storage compartment 30 further includes a front landing 36 disposed adjacent to a vertically extending wall 38, such that the landing 36 and the wall 38 in combination define a lower cradle or guide 40 adapted to receive a lower portion of a portable device. Similarly, the lid 12 includes an upper side 12a and an underside 12b, wherein the front portion of the underside 12b includes an upper cradle or guide member 42 having a generally horizontal landing portion 44 disposed adjacent to a downwardly extending member 46. In assembly, the upper and lower cradles or guides 42, 40 are adapted to receive a portable electronic device in a clamping jaw-like manner to retain the portable device in a display position in the device dock 10 as further described below. It is contemplated that the cradles 42, 40 may be comprised of a non-slip compressible material to better clamp an electronic portable device therein. The device dock 10 of the present invention is adapted to clamp to electronic devices of varying sizes in either a landscape mode or portrait mode as further described below.

Figure 3:
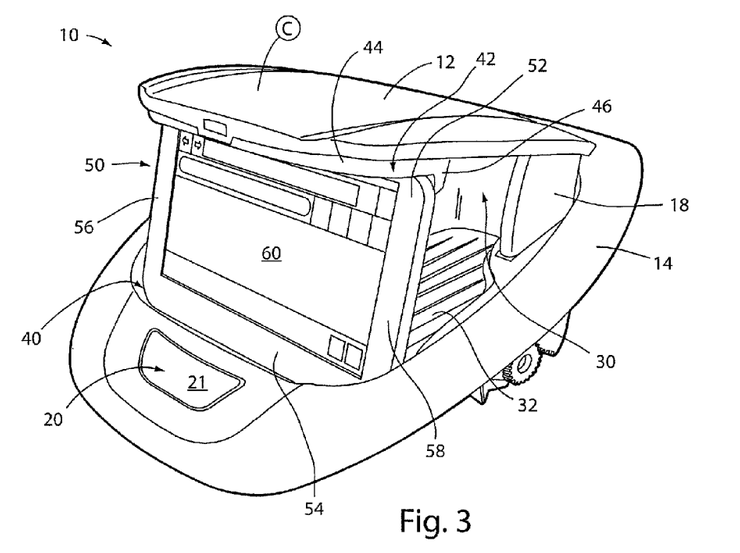
FIG. 3 is a top perspective view of the portable electronic device dock of FIG. 2 having a portable electronic device secured therein.

Referring now to FIG. 3, a portable electronic device 50 is shown as received in the device dock 10. The portable electronic device 50 includes upper and lower portions 52, 54 and side portions 56, 58 which surround a display screen 60. The portable electronic device 50 is shown in FIG. 3 as a mobile phone secured in a display position within the device dock 10. Specifically, the portable electronic device 50 is received in the upper cradle 42 at the upper portion 52 of the portable electronic device 50, and further received in the lower cradle 40 at the lower portion 54 of the electronic device 50. Thus, as shown in FIG. 3, the lid 12 is in a clamped position C, thereby securing the portable electronic device 50 in the device dock 10. It is contemplated that the portable electronic device 50 may be any type of electronic device for use with the present invention, such as a navigation device, a digital music player, a DVD player and any other such device.

Figure 7:
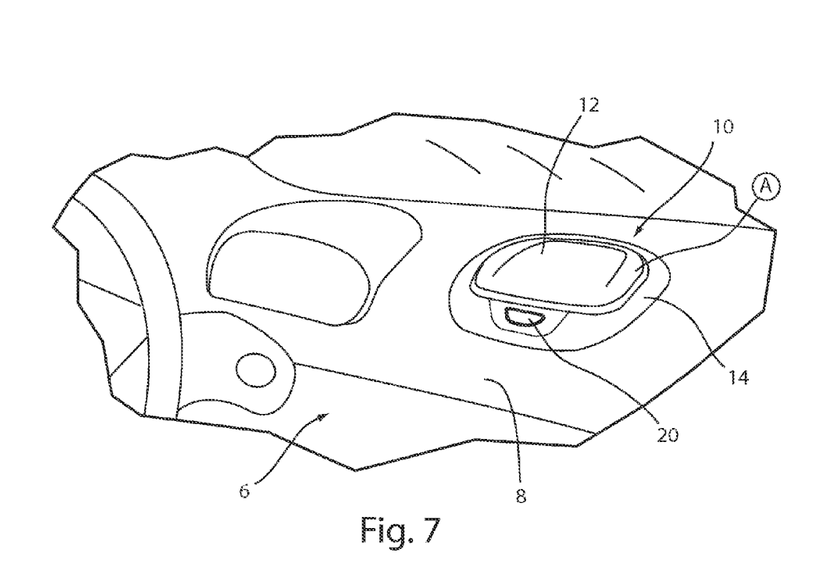
FIG. 7 is a fragmentary perspective view of the portable electronic device dock of FIG. 1 disposed in an instrument panel of a vehicle interior.
Figure 8:
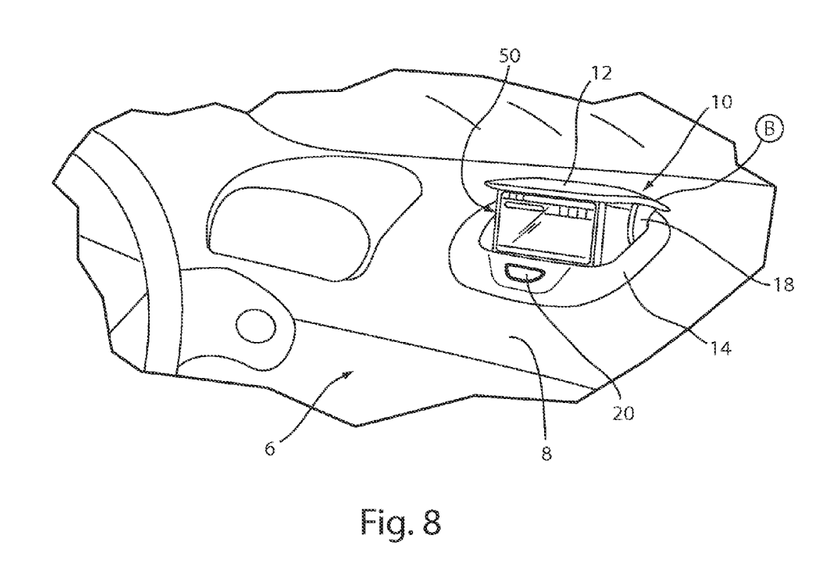
FIG. 8 is a fragmentary perspective view of the portable electronic device dock of FIG. 7 having a portable electronic device secured therein.

Referring now to FIG. 4, the portable electronic device 10 is shown with the housing 14 having an upper portion 14a and a lower portion 14b. A plurality of clip members 70 are disposed around a perimeter of the housing 14 on the underside 14b. In assembly, the clip members 70 are adapted to retain the device dock 10 in an aperture disposed in a vehicle instrument panel, as best shown in FIGS. 7 and 8. The support arms 16, 18 include geared sector portions 16a, 18a respectively. A geared sector portions 16a, 18a of the support arms 16, 18 are arcuately-shaped sector portions having a plurality of spaced apart teeth 16b, 18b which are gearingly engaged with drive members 82, 84 disposed on an axle member 80. The axle member 80 includes a plurality of drive members 82, 84 and 86 which are coupled to the axle member 80 and adapted to rotate with the axle member 80. The axle member 80 is secured to an underside 32a of the storage compartment 30 by inner and outer bracket members 88, 89 which extend outwardly from the underside 32a of the storage compartment 30. Drive members 82, 84 are geared drive members which are adapted to drive the support arms 16, 18 as the lid 12 is moved between the open and closed positions. Drive member 86 is a centrally disposed drive member which is located between arm drive members 82, 84, wherein the central drive member 86 is adapted to gearingly couple to a slide assembly 90. The slide assembly 90 includes a first portion 92 having an upwardly disposed track member 94, and a second portion 96 having a downwardly facing track member 95. In assembly, the downwardly facing track member 95 of the second portion 96 of the slide assembly 90 is adapted to gearingly engage the central drive member 86 as disposed on the axle member 80. The slide assembly 90 includes a housing portion 98 which is disposed between first and second portions 92, 96 and is adapted to house a biasing mechanism therein. As further shown in FIG. 4, a clutch assembly 100 is gearingly coupled to the first portion 92 of the slide assembly 90 and is adapted to retain the lid 12 in the closed position A or the clamped position C as further described below.

As gearingly coupled together, the clutch assembly 100, the slide assembly 90, the axle member 80 and the support arms 16, 18 are adapted to work in concert as the lid 12 is open and closed. This interconnected grouping of components provides for a device dock 10 having the ability to clamp a variety of portable electronic devices, such as the portable electronic device 50 shown in FIG. 3, in a display position for use by a vehicle occupant.

Figure 5:
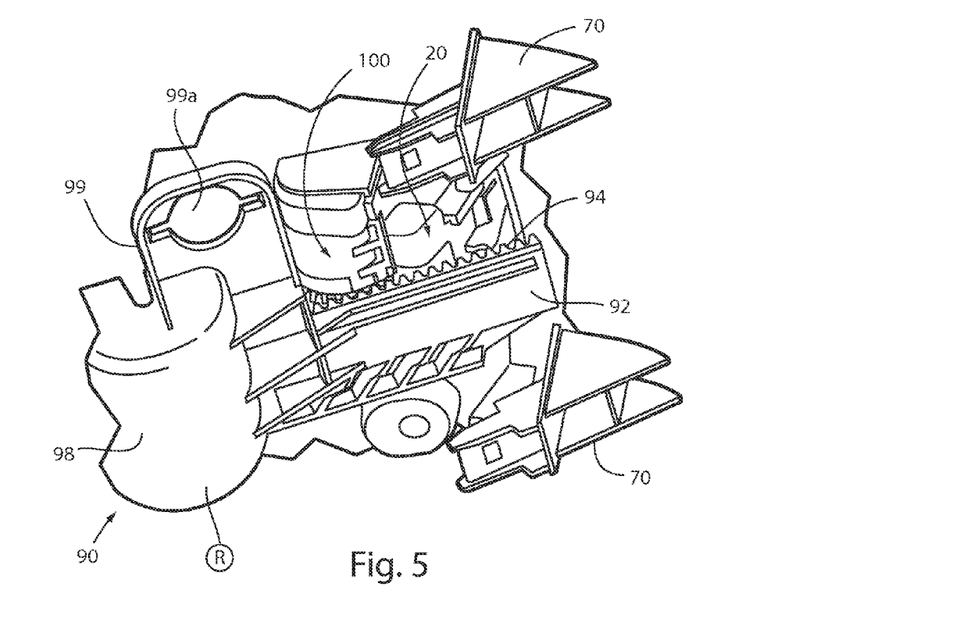
FIG. 5 is a fragmentary bottom perspective view of a slide assembly in a retracted (lid open) position.
Figure 6:
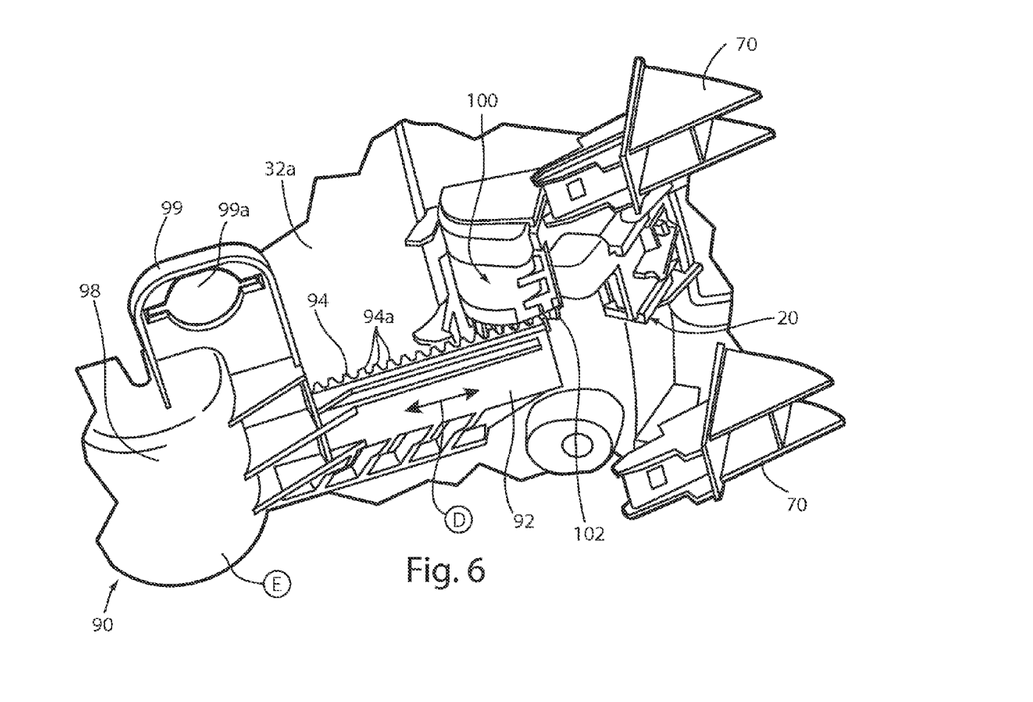
FIG. 6 is a fragmentary bottom perspective view of the slide assembly of FIG. 5 in an extended (lid closed) position.

Referring now to FIGS. 5 and 6, the slide assembly 90 is adapted to move between an extended position E (FIG. 6) and a retracted position R (FIG. 5) in a direction as indicated by arrow D along the underside 32a of the storage compartment 30. The slide assembly 90 is biased towards the retracted position R by a biasing member disposed within the housing portion 98 of the slide assembly 90. When the slide assembly 90 is in the retracted position R, the lid 12, as shown in FIG. 2, is in the open position B. Thus, the biasing mechanism, as further described below, biases the slide assembly 90 to the retracted position R to open the lid 12. As the slide assembly 90 moves to the retracted position R, the downwardly facing track member 95, as shown in FIG. 4, disposed on the second portion 96 of the slide assembly 90 drives the central drive member 86 which thereby rotates the outer drive members 82, 84 to gearingly move the support arms 16, 18 upward to further move the lid 12 to the open position B. As shown in FIG. 6, the slide assembly 90 is in an extended position E, such that, in this extended position E, the lid 12 will be in the closed position A as shown in FIG. 1. Thus, as a user pushes downwardly on the open lid 12, the slide assembly 90 moves to the extended position E as driven by the central drive member 86 which is gearingly coupled to the downwardly facing track member 95 disposed on the second portion 96 of the slide assembly 90. As the slide assembly 90 moves to the extended position E, the biasing member disposed within the housing portion 98 is loaded. As the biasing member is loaded, a force is ready to act on the slide assembly 90 to move the slide assembly 90 to the retracted position R.

As shown in FIG. 6, the track member 94 disposed on the first portion 92 of the slide assembly 90 includes incrementally spaced apart teeth 94a which gearingly couple to a clutch gear 102 disposed on the clutch assembly 100. Thus, as the slide assembly 90 moves between the extended and retracted positions (E, R), the clutch gear 102 rotates as coupled to the track member 94 disposed on the first portion 92 of the slide assembly 90. As further shown in FIGS. 5 and 6, the slide assembly 90 includes a dampener housing 99 having an aperture 99a which is adapted to house a dampener mechanism to dampen the lateral movement of the slide assembly 90. When the slide assembly 90 is dampened, the opening of the lid 12 of the device dock 10 is also dampened.

Referring now to FIGS. 7 and 8, the device dock 10 is shown disposed within a vehicle interior 6 on an instrument panel 8. Thus, the device dock 10 of the present invention is adapted to be disposed directly on the instrument panel 8 within a vehicle interior 6 to seamlessly integrate the device dock 10 within the vehicle interior 6.

Figure 9A:
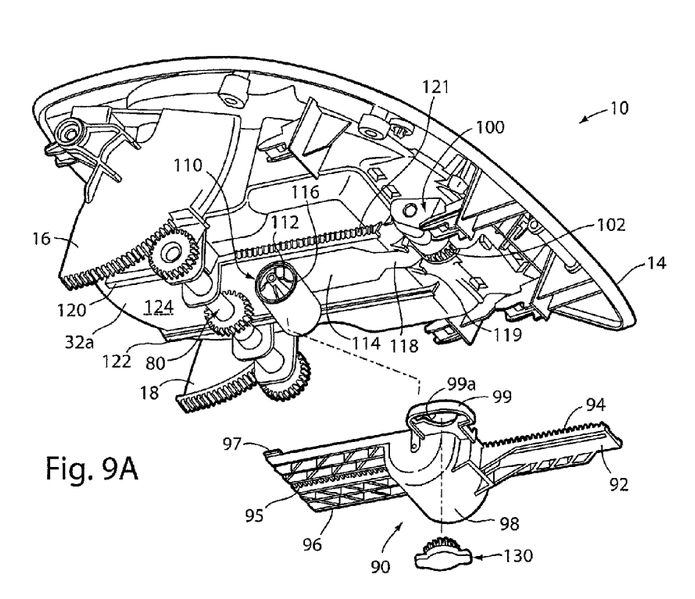
FIG. 9A is an exploded bottom perspective view of the portable device holding assembly of FIG. 4.
Figure 9B:
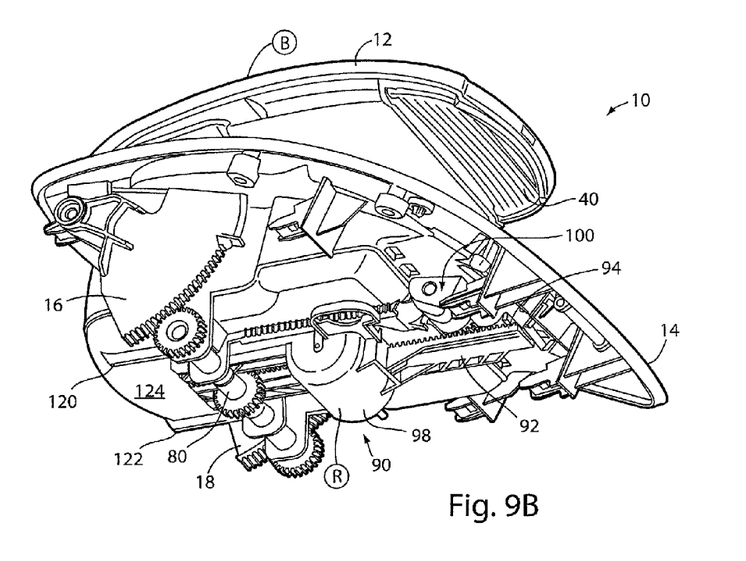
FIG. 9B is bottom perspective view of the portable device holding assembly of FIG. 2.

Referring now to FIGS. 9A and 9B, the device dock 10 is shown with the slide assembly 90 exploded away to reveal a biasing mechanism 110. The biasing mechanism 110, as shown in the embodiment of FIG. 9A, is a tape spring which is a constant force spring which includes a spool 112. The tape spring 110 further includes a body portion 114 having a first end 116 coupled to the spool 112 and a second end 118 which acts as an anchor member coupled to a bracket member 119 disposed on the underside 32a of the storage compartment 30. In assembly, the spool 112 is housed within the housing portion 98 of the slide assembly 90 and the body portion 114 of the tape spring 110 spools around the spool 112 as the slide assembly 90 moves to the retracted position R. As the slide assembly 90 moves to the extended position E, the body portion 114 of the tape spring 110 is rolled out, thereby imparting a load on the slide assembly 90 as coupled to the spool 112. As further shown in FIG. 9A, first and second retaining flanges 120, 122 extend downwardly from the underside 32a of the storage compartment 30 and generally include L-shaped cross-sections. In this way, the retaining flanges 120, 122 define a channel 124 disposed therebetween. The slide assembly 90 is slidably received in the channel 124 and includes tab members 97 which are adapted to engage the retaining flanges 120, 122 to retain the slide assembly 90 in the channel 124. Thus, as received in the channel 124, the slide assembly 90 is disposed between the axle member 80 and the underside 32a of the storage compartment 30 as shown in FIG. 9B. In this way, the slide assembly 90 is positively retained in the position shown in FIG. 9B. In the embodiment shown in FIGS. 9A and 9B, the first retaining flange further includes a track member 121 disposed along a side portion thereof. The track member 121 is adapted to engage a dampening mechanism 130 which, as shown in FIG. 9A, is adapted to be received in aperture 99a of the dampener housing 99. It is contemplated that the dampening mechanism 130 is a viscous dampener which is adapted to gearingly engage the track member 121 and rotate within the dampening housing 99 as the slide assembly 90 moves between the extended and retracted positions (E, R). As shown in FIG. 9B, the slide assembly 90 is in the retracted position R, such that the lid 12 of the device dock 10 is in the open position B. As noted above, the biasing mechanism 110, as shown in FIG. 9A, biases the slide assembly 90 to the retracted position R, such that when the lid 12 is released from the clutch assembly 100, the lid 12 will move to the open position B as the slide assembly 90 moves to the retracted position R.

Figure 10:
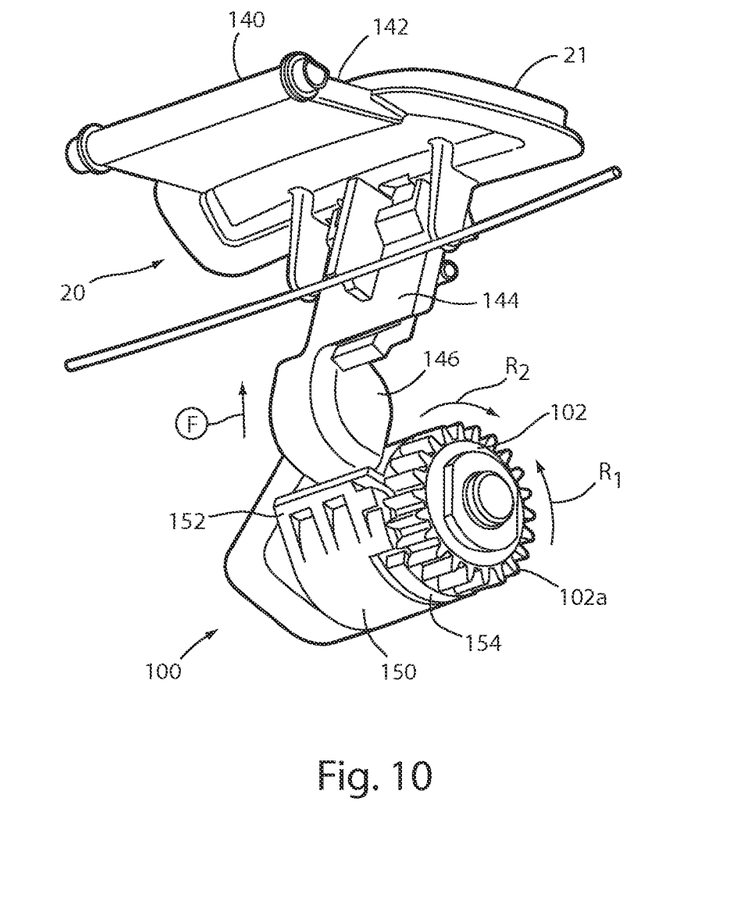
FIG. 10 is a perspective view of a clutch assembly as coupled to an actuator assembly.

Referring now to FIG. 10, the actuator assembly 20 includes the actuator button which is hingedly connected to the underside of the housing 14a (not shown) by a hinged coupling 140 having a support arm 142 which is directly coupled to the actuator button 21. The actuator button further includes an arm 144 extending downwardly therefrom having a catch 146 positioned thereon. In assembly, the catch 146 is adapted to abut a stop member 152 disposed on a clutch release sleeve 150 which is engaged with a spring member 154. Thus, as the lid 12 of the device dock 10, shown in FIG. 2, is pushed downward to the closed position A, the slide assembly 90 moves in a car-forward direction to the extended position E, shown in FIG. 6. This movement of the slide assembly 90 moves the slide assembly 90 away from the clutch assembly 100, thereby rolling out the constant force spring 110 (FIG. 9A), and further rotates the clutch gear 102 in a direction as indicated by arrow $R_2$. Thus, the clutch gear 102 slips in the direction indicated by arrow $R_2$ as the track member 94 of the slide assembly 90 moves in a car-forward direction. When the user stops pushing down on the lid 12 of the device dock 10, the clutch assembly 100, which is shown as a spring clutch assembly in FIG. 10, prevents the slide assembly 90 from moving back to the retracted position R (FIG. 5), such that the lid 12 will remain in a clamped position C on the portable electronic device 50, as shown in FIG. 3. Thus, the clutch gear 102 is adapted to lock on the track member 94 of the first portion 92 of the slide assembly 90 as the slide assembly 90 is biased by the biasing mechanism 110 to the retracted position R, to retain the lid 12 in the clamped position C. When the user wishes to remove the portable electronic device 50 from the device dock 10, the user will push downwardly on the actuator button 21 to raise the catch member 146 in a direction as indicated by arrow F to release the clutch release sleeve at stop member 152, such that the clutch gear 102 is free to rotate in the direction as indicated by $R_1$, which is the direction the clutch gear 102 will rotate as the biasing mechanism 110 pulls the slide assembly 90 towards the clutch assembly 100, thereby causing the lid 12 to open and release the portable electronic device 50.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A portable electronic device dock, comprising:
    a storage compartment having a lid operable between open and closed positions;
    a slide assembly operably coupled to the lid and adapted to bias the lid to the open position;
    a clutch assembly gearingly engaged with the slide assembly and adapted to retain the lid in a clamped position, wherein an electronic device is secured between the lid and the storage compartment; and
    first and second retaining flanges disposed on an underside of the storage compartment, the first and second retaining flanges defining a channel, wherein the slide assembly is slideably received in the channel between extended and retracted positions, and further wherein the slide assembly includes a first portion and a second portion, each portion of the slide assembly including a track member.

2. The portable electronic device dock of claim 1, including:
    an axle member disposed on the underside of the storage compartment, the axle member having a plurality of drive members coupled thereto.

3. The portable electronic device dock of claim 2, wherein, the plurality of drive members includes first and second arm drivers and a central driver disposed between the first and second arm drivers, the central driver adapted to gearingly engage the track member of the second portion of the slide assembly.

4. The portable electronic device dock of claim 3, including:
  first and second support arms operably coupled to an underside of the lid, the first and second support arms having geared sector portions disposed thereon, wherein, the first and second arm drivers are adapted to gearingly engage the geared sector portions of the first and second support arms respectively.

5. The portable electronic device dock of claim 4, including:
  a housing portion disposed on the slide assembly between the first and second portions of the slide assembly; and
  a biasing member received in and coupled to the housing portion at a first end, the biasing member further coupled to the underside of the storage compartment at a second end.

6. The portable electronic device dock of claim 5, wherein, the clutch assembly includes a clutch gear that is gearingly engaged with the track member of the first portion of the slide assembly.

7. The portable electronic device dock of claim 6, wherein, the clutch gear is adapted to slip as the lid is moved to the closed position and the slide assembly is moved to the extended position, and further wherein the biasing mechanism is loaded as the slide assembly is moved to the extended position.

8. The portable electronic device dock of claim 7, wherein, the clutch gear is adapted to lock on the track member of the first portion of the slide assembly as the slide assembly is biased by the biasing mechanism to the retracted position, to retain the lid in the clamped position.

9. The portable electronic device dock of claim 8, including:
  an actuator assembly coupled to the clutch assembly, the actuator assembly having an actuator button adapted to release the clutch gear, such that the slide assembly is able to move to the retracted position as driven by the biasing mechanism, as the lid moves to the open position from the clamped position.

10. A portable electronic device dock, comprising:
  a storage compartment disposed in a vehicle dashboard;
  a lid hingedly coupled to the storage compartment;
  a slide assembly coupled to both the lid and the storage compartment and adapted to bias the lid to an open position;
  a clutch assembly coupled to the slide assembly and adapted to retain the lid in a clamped position to clamp an electronic device between the lid and the storage compartment;
  first and second retaining flanges disposed on an underside of the storage compartment, the first and second retaining flanges defining a channel, wherein the slide assembly is slideably received in the channel between extended and retracted positions, and further wherein the lid is moved to an open position as the slide assembly moves to the retracted position;
  an axle member disposed on the underside of the storage compartment, the axle member configured to retain the slide assembly in the channel and having a plurality of drive members;
  first and second support arms operably coupled to an underside of the lid, each of the support arms having geared sector portions gearingly engaged a drive member of the plurality of drive members;
  a first cradle member disposed on the underside of the lid;
  a second cradled member disposed on the storage compartment, the first and second cradle members adapted to receive the electronic device when the lid is in the clamped position; and
  first and second track members disposed on first and second portions of the slide assembly, wherein the first track member is gearingly engaged with a clutch gear of the clutch assembly, and further wherein the second track member is gearingly engaged with a drive member of the plurality of drive members disposed on the axle member.

11. The portable electronic device dock of claim 10, including:
  a biasing member coupled to the slide assembly at a first end, the biasing member further coupled to the underside of the storage compartment at a second end, the biasing member adapted to bias the slide assembly to the retracted position, thereby moving the lid to the open position.

12. The portable electronic device dock of claim 11, wherein, the biasing mechanism is a constant force tape spring having a spool rotatably coupled to the slide assembly.

13. The portable electronic device dock of claim 12, wherein, the clutch gear is adapted to slip as the lid is moved to the closed position and the slide assembly is moved to the extended position, and further wherein the biasing mechanism is loaded as the slide assembly is moved to the extended position, the clutch gear adapted to lock on the track member of the first portion of the slide assembly as the slide assembly is biased by the biasing mechanism to the retracted position, to retain the lid in the clamped position.

14. A portable electronic device dock, comprising:
  a storage compartment having a lid operable between open and closed positions;
  a slide assembly gearingly coupled to the lid,
  a biasing member operably coupled to the slide assembly at a first end and further coupled to the storage compartment at a second end, the biasing member adapted to bias the lid to the open position by driving the slide assembly to a retracted position;
  a clutch assembly gearingly engaged with the slide assembly and adapted to retain the slide assembly in a partially extended position, such that an electronic device is secured between the lid and the storage compartment;
  first and second retaining flanges disposed on an underside of the storage compartment, the first and second retaining flanges defining a channel, wherein the slide assembly is slideably received in the channel between extended and retracted positions, and further wherein the lid is moved to open and closed positions as the slide assembly moves between the retracted and extended positions respectively;
  a track member disposed on one of the first and second retaining flanges; and
  a damper mechanism disposed on the slide assembly, the damper mechanism gearingly engaged with the track member disposed on one of the first and second retaining flanges, the damper mechanism adapted to damper movement of the lid to the open position as biased by the biasing member.

15. The portable electronic device dock of claim 14, including:
  a clutch gear disposed on the clutch assembly, the clutch gear adapted to slip as the lid is moved to the closed position and the slide assembly is moved to the extended position, and further wherein the biasing mechanism is loaded as the slide assembly is moved to the extended position, the clutch gear further adapted to lock the slide assembly as the slide assembly is biased by the biasing mechanism to the retracted position, to retain the lid in the partially extended position.

* * * * *